US008315506B2

(12) United States Patent
Goodman et al.

(10) Patent No.: US 8,315,506 B2
(45) Date of Patent: Nov. 20, 2012

(54) HOME TELEPRESENCE WITH CONTENT INSERTION

(75) Inventors: Lee Goodman, Tyngsboro, MA (US); Rezwanul Azim, Lexington, MA (US); Robert H Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 389 days.

(21) Appl. No.: 12/610,555

(22) Filed: Nov. 2, 2009

(65) Prior Publication Data

US 2011/0103770 A1    May 5, 2011

(51) Int. Cl.
*H04N 9/80* (2006.01)
(52) U.S. Cl. .................. 386/252; 386/253
(58) Field of Classification Search .......... 386/248, 386/252–253
See application file for complete search history.

(56) References Cited

U.S. PATENT DOCUMENTS

| 7,614,066 B2* | 11/2009 | Urdang et al. ............... 725/34 |
| 2002/0150244 A1* | 10/2002 | Kim et al. .................. 380/201 |
| 2004/0123312 A1* | 6/2004 | Kimura ...................... 725/31 |
| 2005/0144468 A1* | 6/2005 | Northcutt et al. ............ 713/189 |
| 2008/0260161 A1* | 10/2008 | Yokota et al. ............... 380/278 |
| 2009/0083758 A1* | 3/2009 | Martin et al. ............... 719/313 |
| 2010/0008500 A1* | 1/2010 | Lisanke et al. ............. 380/201 |

\* cited by examiner

*Primary Examiner* — Thai Tran
*Assistant Examiner* — Nigar Chowdhury

(57) ABSTRACT

A provisioning device intercepts program content from a video client or another multimedia device, where the program content includes copy-protection encryption, and receives additional content from a local router or another networked device, where the additional content is Internet protocol (IP) content. The provisioning device removes the copy-protection encryption from the program content and combines the additional content with the program content. The provisioning device also adds copy-protection encryption to the combined additional content and program content, and sends the copy-protected combined content to a display device.

22 Claims, 9 Drawing Sheets

HOME TELEPRESENCE WITH CONTENT INSERTION

BACKGROUND INFORMATION

Content may be delivered to a display (e.g., a television) in a variety of ways, such as a video client (e.g., a set-top box), a digital video recorder (DVR), an IP streaming device, direct cables, antennas, and/or other networks. With any of these types of content delivery, it is difficult to insert additional content, at a local level, that is not already part of a media stream.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may enable local content insertion into an existing media stream. In an exemplary implementation, a provisioning device may be inserted between an incoming video stream and a display device (e.g., a television). The provisioning device may receive additional content, separate from the incoming video stream, and selectively merge, replace, and/or pass through the incoming video stream and/or the additional content. The incoming video stream may include, for example, any content being delivered to the display device from a video client (such as a set-top box), a DVR, a, optical disk player (e.g., DVD, Blu-ray disc, etc.) an antenna system, a gaming console, etc. Additional content may include any content that may be received by the provisioning device (e.g., received separately from the incoming video stream) for presentation on the display device. In an exemplary implementation, the additional content may be received via internet protocol (IP).

In one implementation, the additional content may be presentation of video telepresence information (e.g., video telephony). For example, if there is an active video call being established, the provisioning device may insert (or merge) the video from the video call into the current video stream. If the end user accepts the call, the user can see, presented on the display device, the video stream replaced by (or merged with) the video call. In other implementations, additional content may include, for example, advertising, really simple syndication (RSS) feeds, IP television (IPTV), web-based content (e.g., social networking web sites, image sharing web sites, audio feeds, etc.), etc.

Figure 1:
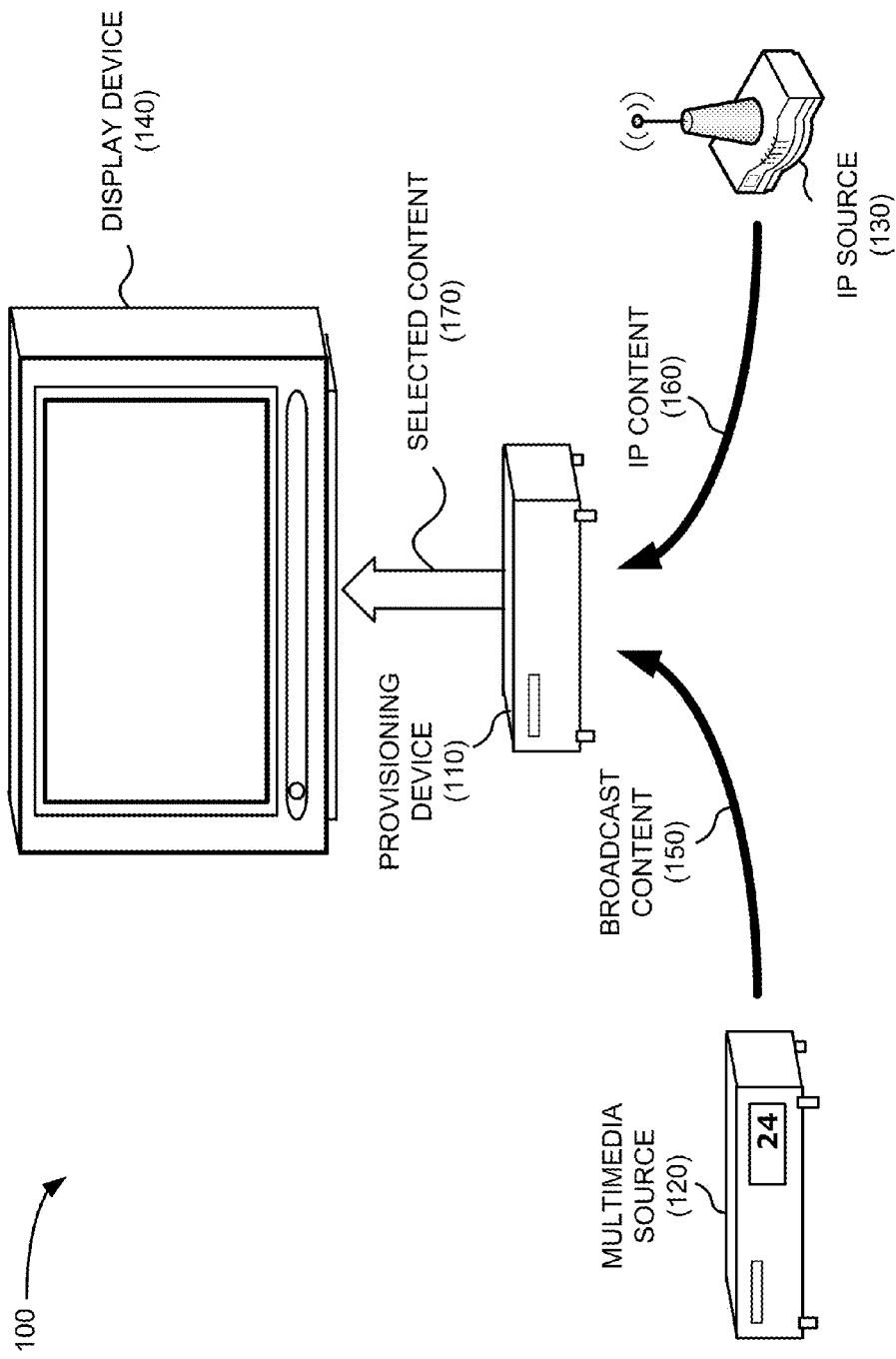
FIG. 1 illustrates an exemplary environment illustrating concepts described herein.

FIG. 1 illustrates an exemplary environment 100 illustrating concepts described herein. As shown in FIG. 1, environment 100 may include a provisioning device 110, a multimedia source 120, an IP source 130, and a display device 140. Provisioning device 110 may be placed in-line between multimedia source 120 and display device 140 to receive content (e.g., broadcast content 150) from multimedia source 120. Multimedia source 120 may include any of a variety of devices, such as a video client (e.g., a set-top box), an antenna system, a DVR, a gaming console, etc., to transmit broad cast content 150 toward display device 140. Provisioning device 110 may also receive content (e.g., IP content 160) from IP source 130. IP source 130 may include any of a variety of devices, such as a home router, a personal computer, a VoIP-enabled device, etc. Provisioning device 110 may provide broadcast content 150 and/or IP content 160 to display device 140 as selected content 170.

In an exemplary implementation, provisioning device 110 may operate in different modes. In one mode, provisioning device 110 may simply allow broadcast content 150 from multimedia source 120 to pass through to display device 140 (e.g., pass-through mode). In another mode, provisioning device 110 may replace broadcast content 150 with IP content 160 (e.g., switched mode). In still another mode, provisioning device 110 may combine broadcast content 150 and IP content 160 as a single media stream of selected content 170 (e.g., overlay mode). Combined content may be presented, for example, as a picture-in-picture environment, as secondary content overlaid over primary content, as multiple windows, etc.

Provisioning device 110, multimedia source 120, IP router 130, and display device 140 are described in more detail in connection with, for example, FIGS. 2-4. As used herein, the terms "user," "viewer," "subscriber," and "customer" may refer interchangeably to a person who interacts with, orders, uploads, listens to, views, or plays multimedia content.

Although FIG. 1 illustrates an exemplary arrangement of environment 100, in other implementations, environment 100 may include fewer, different, differently arranged, or additional components than those depicted in FIG. 1. In still other implementations, one or more components of environment 100 may perform one or more other tasks described as being performed by one or more other components of environment 100. For example, in one implementation, provisioning device 110 and IP source 130 may be combined as a single device.

Figure 2:
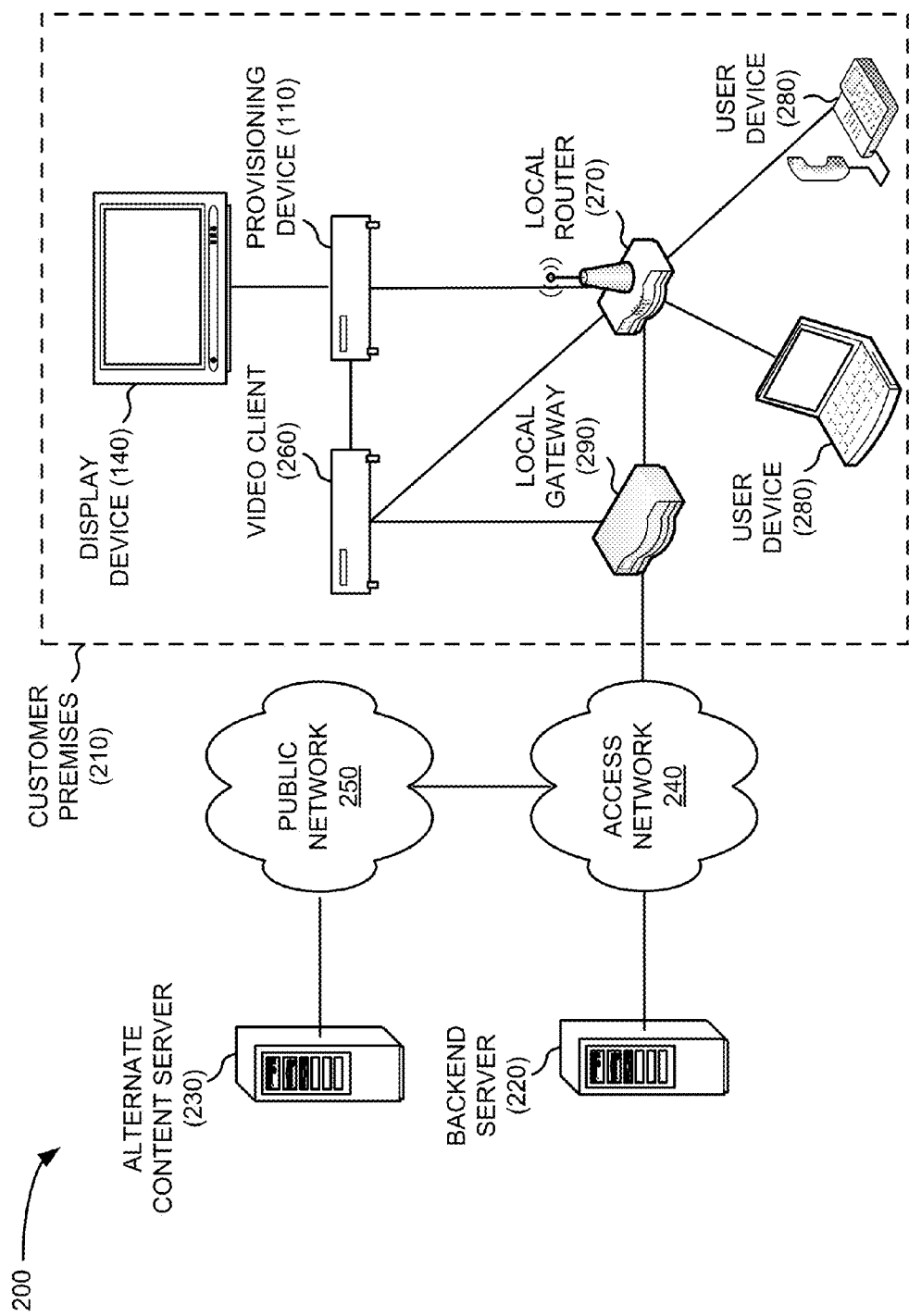
FIG. 2 depicts an exemplary network in which systems and/or methods described herein may be implemented.

FIG. 2 is a diagram of an exemplary network 200 in which systems and/or methods described herein may be implemented. As illustrated, network 200 may include customer premises 210, a backend server 220, and an alternate content server 230 interconnected by an access network 240 and/or a public network 250. Customer premises 210 may include provisioning device 110, display device 140, video client 260, local router 270, user devices 280, and a local gateway 290. Customer premises 210 may be connected via access network 240 to backend server 220 located at, for example, a subscription multimedia service provider's premises. Components of network 200 may interconnect via wired and/or wireless connections.

For simplicity, a single customer premises 210 (including one provisioning device 110, one video client 260, one display device 140, one local router 270, two user devices 280, and one local gateway 290), backend server 220, alternate content server 230, access network 240, public network 250 have been illustrated in FIG. 2. In practice, there may be more customer premises 210, backend servers 220, alternate content servers 230, access networks 240, and public networks 250, and/or more components within any of these components. Also, in some instances, one or more of the components of network 200 may perform one or more functions described as being performed by another one or more of the components of network 200.

Provisioning device 110 may include any device capable of receiving one or more incoming video streams and providing at least one of the one or more video streams to display device 140. In one implementation, provisioning device 110 may remove copy-protection encryption from the incoming video stream(s). Provisioning device 110 may also separately receive additional content, combine the incoming video stream with the additional content, and provide the combined video stream and additional content to a display (e.g., display device 140). In one implementation, provisioning device 110 may be connected in-line between a multimedia source (e.g., video client 260, a DVR, a High-Definition Multimedia Interface (HDMI) receiver, etc.) and display device 140 via HDMI connections implementing High-bandwidth Digital Content Protection (HDCP). Provisioning device 110 may, for example, remove HDCP encryption from incoming programming (received from video client 260), merge the incoming programming with one or more additional content streams, and re-encrypt the merged content with HDCP for delivery to display device 140. In another implementation, provisioning device 110 may also, or alternatively, be connected in-line between the multimedia source and display device 140 using composite video and audio cables. Thus, in various implementations, provisioning device 110 may effectively appear as a display device (e.g., display device 140) to video client 260 and may effectively appear as a video client (e.g., video client 260) to display device 140. In some implementations, provisioning device 110 may be incorporated within display device 140 or video client 260.

Video client 260 may include any device capable of receiving, transmitting, and/or processing information to and/or from access network 240. In one implementation, video client 260 may be a closed device (e.g., including a hardware/software configuration that is not accessible to the general public). In an exemplary implementation, video client 260 may provide HDCP encrypted video signals directed toward display device 140 via HDMI. The HDCP-encrypted video signals may be intercepted and processed by provisioning device 110. Examples of video client 260 may include a set-top box, a computer, a cable card, and a portable electronic device (e.g., a cell phone, a personal digital assistant (PDA), etc.). Video client 260 may receive a television or other multimedia signal from local gateway 290, may convert the signal to a form usable by display device 140, and may transmit the signal to display device 140 for display. In an exemplary implementation, video client 260 may also include an integrated digital video recorder (DVR) or other memory device that may enable video client 260 to store content for later retrieval/presentation to a user based on, for example, user interactions with a content insertion interface for provisioning device 110.

Local router 270 may include a device that may provide connectivity between equipment (e.g., provisioning device 110 and/or user devices 280) within customer premises 210 and network public network 250. In one implementation, local router 270 may function as a dynamic host configuration protocol (DHCP) server to assign network addresses, and provide other configuration information, to user devices 280. Local router 270 may also provide firewall functionality, such as packet filtering and protection against network attacks. In one implementation, local router 270 may include a wireless router may permit a wireless user device (e.g., one of user devices 280) to connect to other customer premises equipment and/or gain access to public network 250.

Display device 140 may include a digital or analog display via which a user may view multimedia content (including, for example, conventional programming, interactive displays, and/or advertising). Display device 140 may refer to any device that can receive and display multimedia content delivered over access network 240 and/or through video client 260 for perception by users. Display device 140 may include technologies, such as cathode ray tube (CRT) displays, liquid crystal displays (LCDs), light-emitting diode (LED) displays, plasma displays, etc.

User devices 280 may include any type or form of computation or communication device that may communicate via public network 250. User devices 280 may include, for example, a personal computer, a laptop, a personal digital assistant (PDA), or another type of computation or communication device that may connect to local router 270 via a wired or wireless connection. In one implementation, user devices 280 may include a telephone device (e.g., a VoIP telephone or conventional telephone) or another type of device that is capable of providing telephone services.

Local gateway 290 may include a network device that provides an interface from access network 240 to video client 260 and/or local router 270. For example, when telecommunication services are provided to a customer's premises via an optical fiber, local gateway 290 may include an optical network terminal (ONT) that connects to the optical fiber. The ONT may convert between signals appropriate for display device 140 and signals appropriate for transmission over optical fiber. For example, the ONT may include a coaxial cable connection that leads to display device 140 or video client 260. The ONT may also include an Ethernet output port for connecting to local router 270 or a user device 280 (e.g., a personal computer or a voice over Internet protocol (VoIP) telephone), and/or a standard telephone port for connecting to a standard telephone. Local gateway 290 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Backend server 220 may include one or more servers or other network devices used to deliver or control delivery of the telecommunication services to customer premises 210 via access network 240. For example, backend server 220 may include television broadcast facilities, network switches or routers, etc. Examples of backend server 220 may include a headend device that provides broadcast television programs, a video-on-demand (VOD) device or other device that provides multimedia content upon request, and a program guide information server that provides information related to multimedia content available to customer premises 210.

Alternate content server 230 may include one or more servers or other network devices used to deliver services to customer premises 210 via public network 250. For example, alternate content server 230 may include telephone communication facilities (e.g., VoIP, video telephony, etc.), IP content distribution facilities (e.g., IPTV), etc. Examples of alternate content server 230 may include a web server, session initiation protocol (SIP) messaging server, a video voicemail server, etc. In one implementation, alternate content sever 230 may provide multimedia content that can be presented to a user on display device 140.

Access network 240 may provide customers with multimedia content provided, for example, by backend server 220. Access network 240 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 2, access network 240 may include a number of separate networks that function to provide services to customer premises 210. In one implementation, access network 240 may terminate at customer premises 210 via an optical communication link, such as an optical fiber provided to customer premises 210. In another possible implementation, access network 240 may terminate at customer premises 210 via a coaxial cable. In still another implementation, access network 240 may terminate at customer premises 210 via a wireless (e.g., satellite) connection.

Public network 250 may include a wide area network, an intranet, a telephone network (e.g., the Public Switched Telephone Network), or a combination of networks. Public network 250 may include, for example, an untrusted network, such as the Internet. Public network 250 may further include transport and/or network devices such as routers, switches, and/or firewalls.

In implementations described herein, video client 260 may receive programming from backend server 220, which may generally pass through provisioning device 110 for presentation on display device 140. At some point in time, local router 270 may receive information from alternate content server 230 and/or user device 280 and forward the information to provisioning device 110. Provisioning device 110 may, for example, decrypt the programming from backend server 220, insert the information from alternate content server 230, re-encrypt the combined programming, and provide the combined programming to display device 140 for presentation to the viewer.

Figure 3:
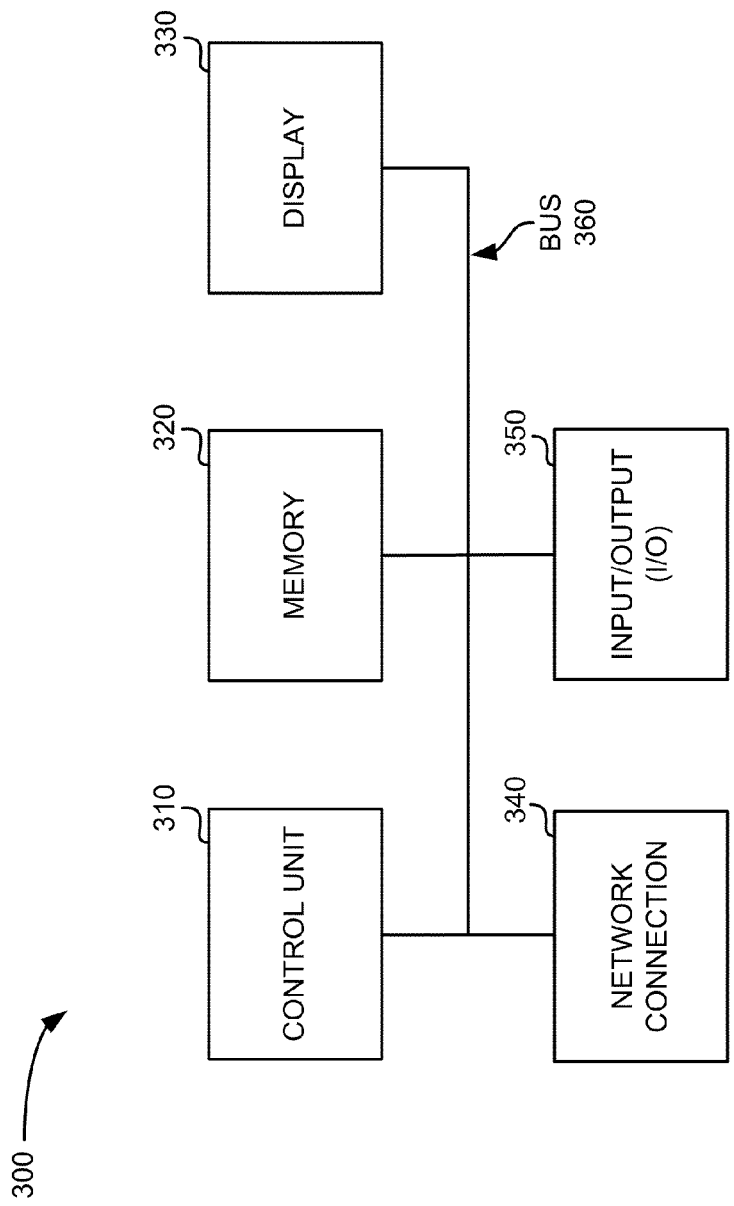
FIG. 3 is a block diagram of exemplary components of a device that may correspond to a provisioning device or video client of FIG. 2.

FIG. 3 is a diagram of exemplary components of a device 300 that may correspond to provisioning device 110 and/or video client 260. As shown, device 300 may include a control unit 310, a memory 320, a display 330, a network interface 340, an input/output (I/O) component 350, and a bus 360.

Control unit 310 may include one or more processors, microprocessors, or another type of processing logic that interprets and executes instructions. Among other functions, control unit 310 may decrypt/encrypt and decode/re-encode primary content received from, for example, backend server 220.

Memory 320 may include one or more dynamic or static storage devices that may store information and instructions for execution by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 330 may include any component capable of providing visual information. For example, in one implementation, display 330 may be a light emitting diode (LED), a liquid crystal display (LCD), etc. Network interface 340 may include any transceiver-like mechanism that enables device 300 to communicate with other devices and/or systems, such as local router 270. For example, network interface 340 may include an Ethernet interface, an optical interface, a coaxial interface, a radio interface, or a combination of these interfaces. Network interface 340 may allow for wired and/or wireless communication.

Input/output component 350 may generally include user input devices, such as external buttons, and output devices, such as LED indicators. With input/output component 350, a user may generally interact with device 300. In some implementations, input/output component 350 may be implemented via a remote control. Bus 360 may provide an interface through which components of device 300 can communicate with one another.

As will be described in detail below, device 300 may perform certain operations relating to content decryption/encryption and content insertion. Device 300 may perform these operations in response to control unit 310 executing software instructions contained in a computer-readable medium, such as memory 320. A computer-readable medium may be defined as a physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. In still other implementations, one or more components of device 300 may perform one or more other tasks described as being performed by one or more other components of device 300.

Figure 4:
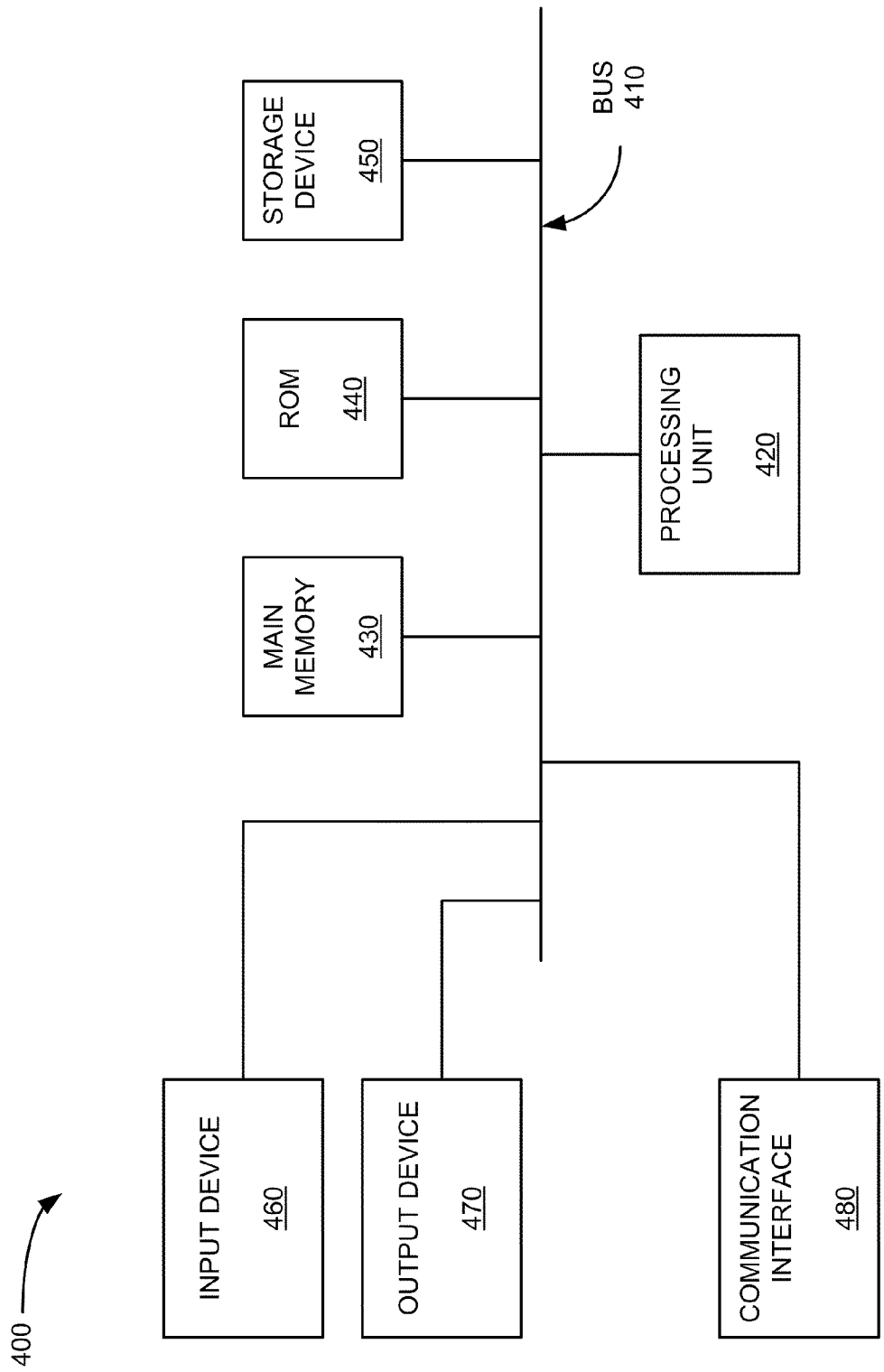
FIG. 4 is a block diagram of exemplary components of a device that may correspond to a backend server and/or an alternate content server of FIG. 2.

FIG. 4 is a diagram of exemplary components of a device 400 that may correspond to backend server 230, alternate content server 230, and/or user devices 280. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include one or more processors, microprocessors, or other types of processing units, such as application-specific integrated circuits (ASICs), field-programmable gate arrays (FPGAs), etc., that may interpret and execute instructions.

Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as video client 260.

As will be described in detail below, device 400 may perform certain operations. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 4 illustrates exemplary components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5:
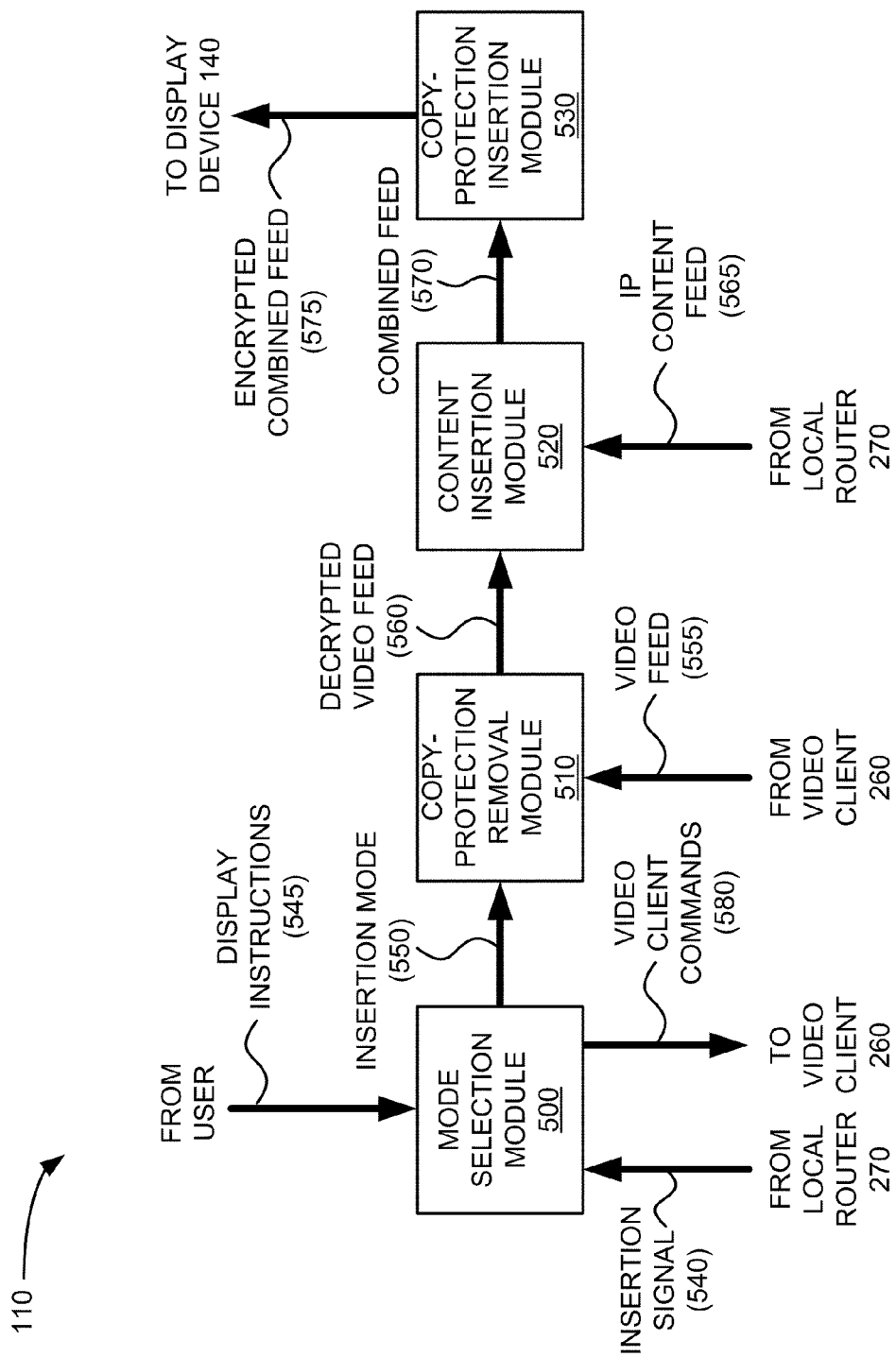
FIG. 5 illustrates a diagram of exemplary functional components of the provisioning device of FIG. 2.

FIG. 5 depicts a diagram of exemplary functional components of provisioning device 110. In one implementation, the functions described in connection with FIG. 5 may be performed by one or more of the components of device 300, as depicted in FIG. 3. As shown in FIG. 5, provisioning device 110 may include a mode selection module 500, a copy-protection removal module 510, a content insertion module 520, and a copy-protection insertion module 530.

Mode selection module 500 may include hardware or a combination of hardware and software that identifies an insertion mode for provisioning device 110. For example, mode selection module 500 may select from a pass-through mode, a switched mode, and an overlay mode for provisioning device 110. In the pass-through mode, provisioning device 110 may simply direct content from video client 260 (or another video stream source) to display device 140. In the switched mode, provisioning device 110 may replace content from video client 260 (or another video stream source) with content from another source (e.g., from alternate content server 230 or user device 280 via router 270). In the overlay mode, provisioning device 110 may combine the content stream from video client 260 (or another video stream source) with content from another source (e.g., from alternate content server 230 or user device 280 via local router 270).

In one implementation, mode selection module 500 may receive an insertion signal 540 from local router 270. Insertion signal 540 may include an indication from another device (e.g., from alternate content server 230 or user device 280 via router 270) that alternate content is available to be inserted. Insertion signal may include, for example, an indication that a video telephony call session has been requested, an indication that an advertisement is available for display, an indication that a user has requested additional content via another device (e.g., via user device 280). Alternatively, or additionally, mode selection module 500 may receive display instructions 545 from a user (e.g., via user device 280, control buttons associated with provisioning device 110, or a remote control) to indicate a mode (e.g., pass-through mode, switched mode, or overlay mode) for provisioning device 110. Display instructions 545 may, for example, indicate that a user wishes to place a video telephony call, initiate video-on-demand programming from alternate content server 230, respond to a prompt for alternate content, or receive other alternate content. Based on the insertion signal 540 and/or display instructions 545, mode selection module 500 may send an insertion mode signal 550 to copy-protection removal module 510.

Copy-protection removal module 510 may include hardware or a combination of hardware and software that removes copy-protection encryption (e.g., HDCP or another form of digital copy protection) from content received from a video input, such as video client 260. Copy-protection removal module 510 may receive insertion mode signal 550 from mode selection module 500. Copy-protection removal module 510 may also receive video feed 555 from video client 260 (or from another video input). Video feed 555 may include program content that has already been processed by video client 260 to remove, for example, proprietary encoding and to add/maintain digital copy protection. Based on the mode indicated in insertion mode signal 550, copy-protection removal module 510 may or may not apply algorithms to remove copy protection from video feed 555. For example, if insertion mode signal 550 indicates the pass-through mode or the switch mode, copy-protection removal module 510 may not decrypt video feed 555. In contrast, if insertion mode signal 550 indicates the overlay mode, copy-protection removal module 510 may decrypt video feed 555 to allow, for example, insertion of additional content. In overlay mode, as shown in FIG. 5, copy-protection removal module 510 may forward a decrypted video feed 560 to content insertion module 520. In pass-through mode and/or switched mode, decrypted video feed 560 may or may not actually be decrypted.

Content insertion module 520 may include hardware or a combination of hardware and software that replaces or combines content from video client 260 with additional content from another source (e.g., content received from local router 270). In one implementation, content insertion module 520 may receive decrypted video feed 560 from copy-protection removal module 510. Content insertion module 520 may also receive IP content feed 565 from local router 270 (e.g., IP content originating from alternate content server 230 and/or user device 280). Based, for example, on the overlay mode indicated by insertion mode signal 550, content insertion module 520 may convert content from IP content feed into a format useable by display device 140 and may insert the IP content into decrypted video feed 560 to provide a combined feed 570, as shown in FIG. 5. If insertion mode signal 550 indicates the switched mode, content insertion module 520 may convert content from IP content feed into a format useable by display device 140 and may replace decrypted video feed 560 with content from IP content feed 565. If insertion mode signal 550 indicates the pass-through mode, content insertion module 520 may simply forward decrypted video feed 560 to copy-protection insertion module 530.

Copy-protection insertion module 530 may include hardware or a combination of hardware and software that restores (if necessary) copy-protection encryption (e.g., HDCP or another form of digital copy protection) to the content received from content insertion module 520. Copy-protection insertion module 530 may receive combined feed 570 from content insertion module 520. Based on the mode indicated in insertion mode signal 550, copy-protection removal module 510 may or may not apply algorithms to restore copy protection to combined feed 570. For example, if insertion mode signal 550 indicates the pass-through mode, copy-protection insertion module 530 may not need to restore copy-protection to combined feed 570 (e.g., video feed 555, decrypted video feed 560, and combined feed 570 would be the same). In contrast, if insertion mode signal 550 indicates the switched mode or the overlay mode, copy-protection removal module 510 may restore copy protection to combined feed 570, as shown in FIG. 5. Copy-protection insertion module 530 may forward an encrypted (e.g., copy-protected) combined feed 575 to display device 140 for presentation to the viewer.

In an exemplary implementation, provisioning device 110 may also provide commands to video client 260, as indicated by reference number 580. For example, when mode selection module 500 identifies that the switched mode has been selected, mode selection module 500 may send a signal to initiate a DVR capability within video client 260 to record the currently tuned programming (e.g., from backend server 220) while the switched mode of provisioning device 110 is active. In one implementation, video client commands 580 may include instructions to pause and record the currently tuned programming, so as to gracefully return a viewer to the linear programming sequence once provisioning device 110 completes switched mode insertion. In another implementation (e.g., when the overlay mode of provisioning device 110 is inserting media with an audio component), mode selection module 500 may send a mute signal to video client 260 to mute a content stream.

Although FIG. 5 shows exemplary functional components of provisioning device 110, in other implementations, provisioning device 110 may contain fewer, different, differently arranged, or additional functional components than depicted in FIG. 5. In still other implementations, one or more functional components of provisioning device 110 may perform one or more other tasks described as being performed by one or more other functional components of provisioning device 110.

Figure 6:
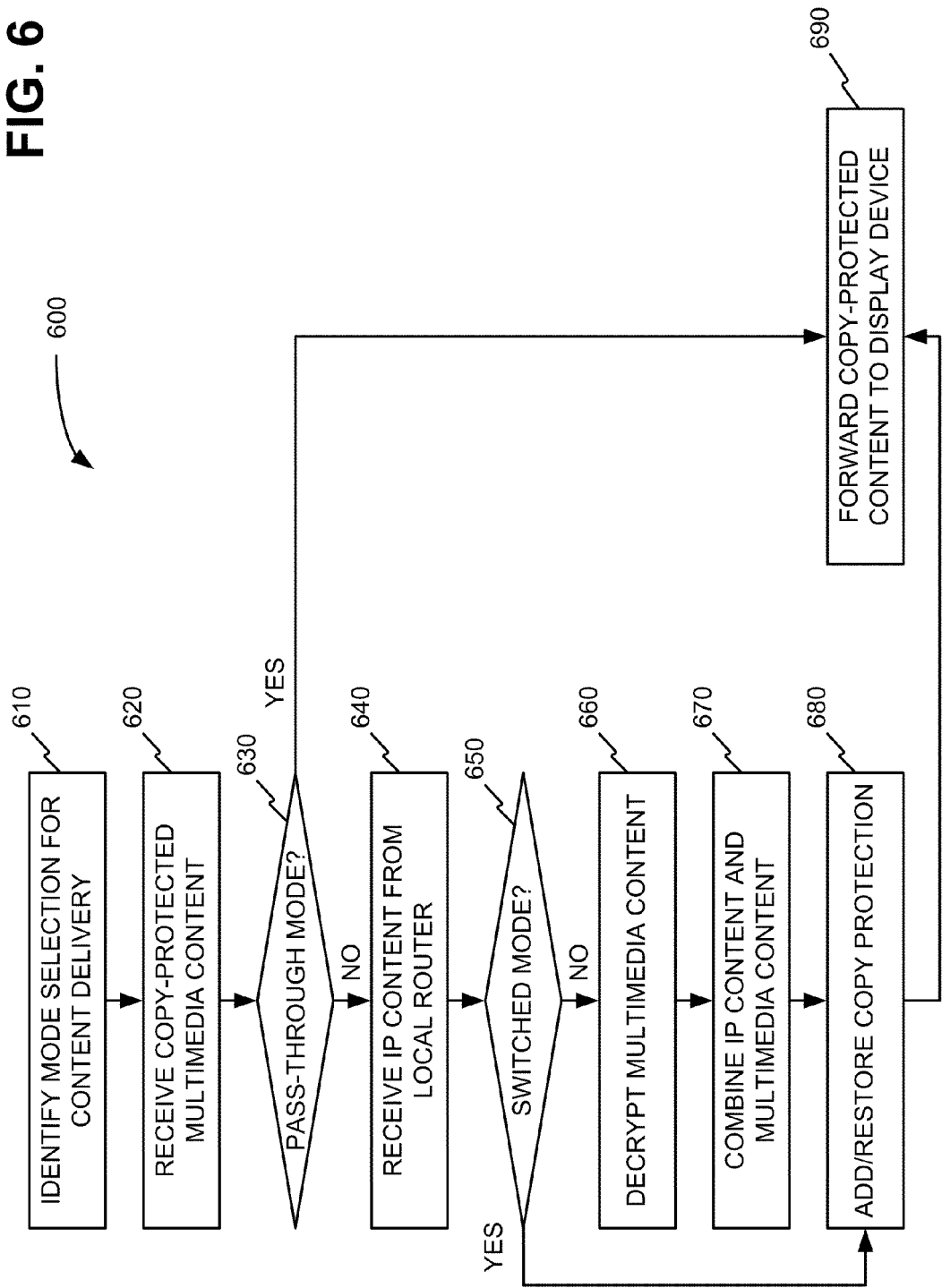
FIG. 6 is a flow chart illustrating an exemplary process for inserting content within an existing video stream according to implementations described herein.

FIG. 6 provides a flow chart of an exemplary process 600 for inserting content within an existing video stream according to implementations described herein. In one implementation, some or all of process 600 may be performed by provisioning device 110. In other implementations, some or all of process 600 may be performed by another device or group of devices including or excluding provisioning device 110.

Process 600 may include receiving a mode selection for content delivery (block 610) and receiving copy protected multimedia content (block 620). For example, as described above in connection with FIG. 5, mode selection module 500 of provisioning device 110 may select from a pass-through mode, a switched mode, and an overlay mode. In the pass-through mode, provisioning device 110 may simply direct content from video client 260 (or another video stream source) to display device 140. In the switched mode, provisioning device 110 may replace content from content from video client 260 (or another video stream source) with content from another source (e.g., from alternate content server 230 or user device 280 via router 270). In the overlay mode, provisioning device 110 may combine the content stream from content from video client 260 (or another video stream source) with content from another source (e.g., from alternate content server 230 or user device 280 via router 270). In one implementation, mode selection module 500 may receive an insertion signal 540 from local router 270. Alternatively, or additionally, mode selection module 500 may receive display instructions 545 from a user (e.g., via user device 280, control buttons associated with provisioning device 110, or a remote control) to indicate a mode (e.g., pass-through mode, switched mode, or overlay mode) for provisioning device 110.

Referring back to FIG. 6, process 600 may include receiving copy protected multimedia content (block 620). For example, as described above in connection with FIG. 5, copy-protection removal module 510 may also receive video feed 555 from video client 260 (or from another video input). Video feed 555 may include program content that has already been processed by video client 260 to remove, for example, proprietary encoding and to add/maintain digital copy protection.

Returning to FIG. 6, it may be determined if pass-through mode is selected (block 630). If the pass-through mode is selected (block 630—YES), process 600 may proceed to process block 690 described below. If the pass-through mode is not selected (block 630—NO), IP content may be received from a local router (block 640). For example, as described above in connection with FIG. 5, content insertion module 520 of provisioning device 110 may receive IP content feed 565 from local router 270 (e.g., IP content originating from alternate content server 230 and/or user device 280). Based, for example, on the mode indicated by insertion mode signal 550, content insertion module 520 may convert content from IP content feed into a format useable by display device 140.

Again referring to FIG. 6, and it may be determined if a switched mode is selected (block 650). For example, mode selection module 500 may determine the current mode selection from insertion signal 540 and/or display instructions 545. If switched mode is selected (block 650—YES), process 600 may proceed to process block 680 described below. If switched mode is not selected (block 650—NO), the multimedia content may be decrypted (block 660) and the IP content and multimedia content may be combined (block 670). For example, as described above in connection with FIG. 5, copy-protection removal module 510 may decrypt video feed 555 to allow, for example, insertion of additional content. Content insertion module 520 may convert content from IP content feed into a format useable by display device 140 and may insert the IP content into the decrypted video feed to provide a combined feed 570.

Referring back to FIG. 6, copy protection may be added and/or restored (block 680), and the copy protected content may be forwarded to the display device (block 690). For example, as described above in connection with FIG. 5, copy-protection insertion module 530 may receive combined feed 570 from content insertion module 520. If insertion mode signal 550 indicates the switched mode or the overlay mode, copy-protection removal module 510 may restore copy protection to combined feed 570, as shown in FIG. 5. Copy-protection insertion module 530 may forward an encrypted (e.g., copy-protected) combined feed 575 to display device 140 for presentation to the viewer.

Figure 7A:
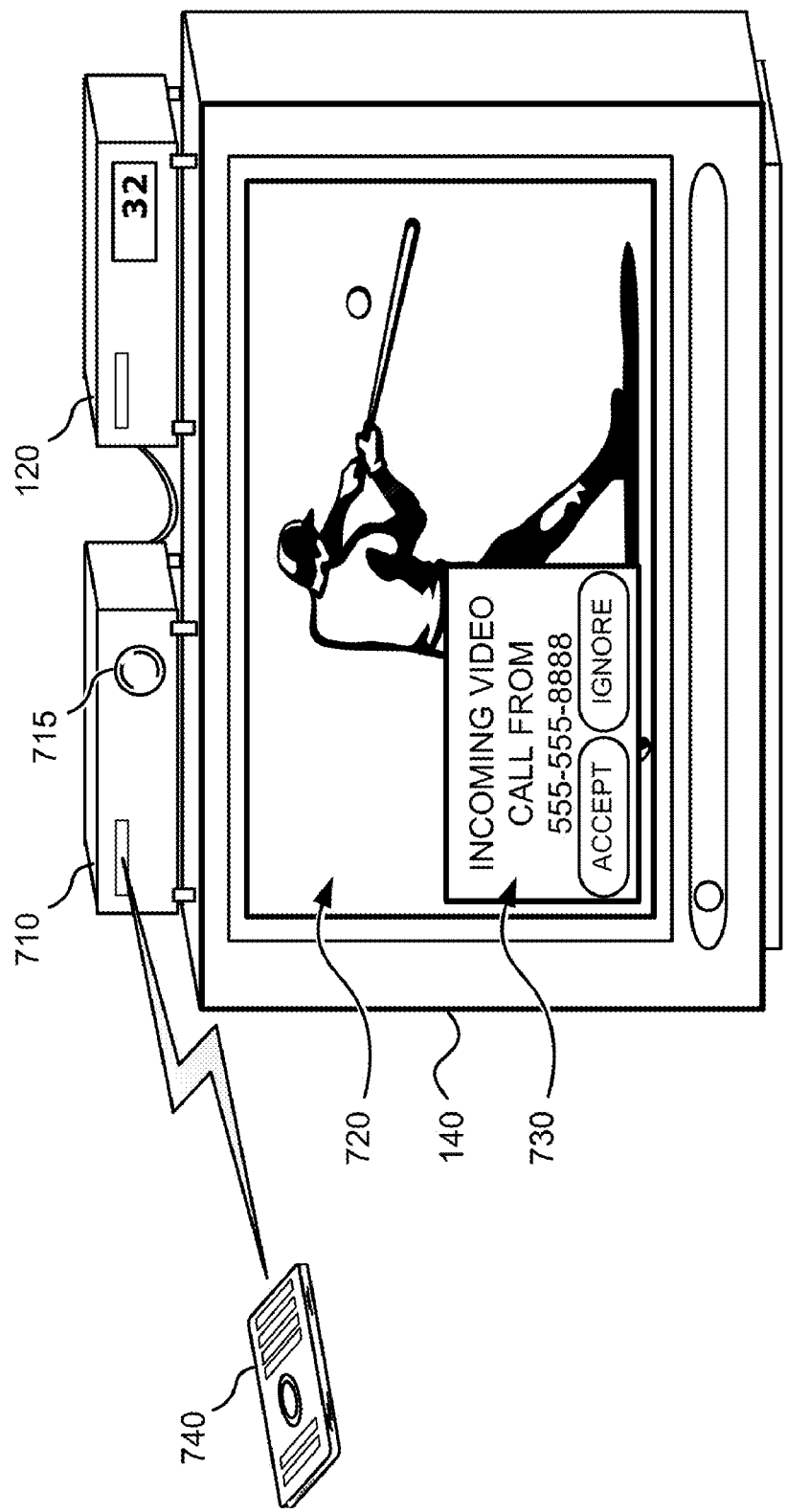
FIGS. 7A and 7B are an exemplary diagrams illustrating a user interface for content insertion according to implementations described herein.
Figure 7B:
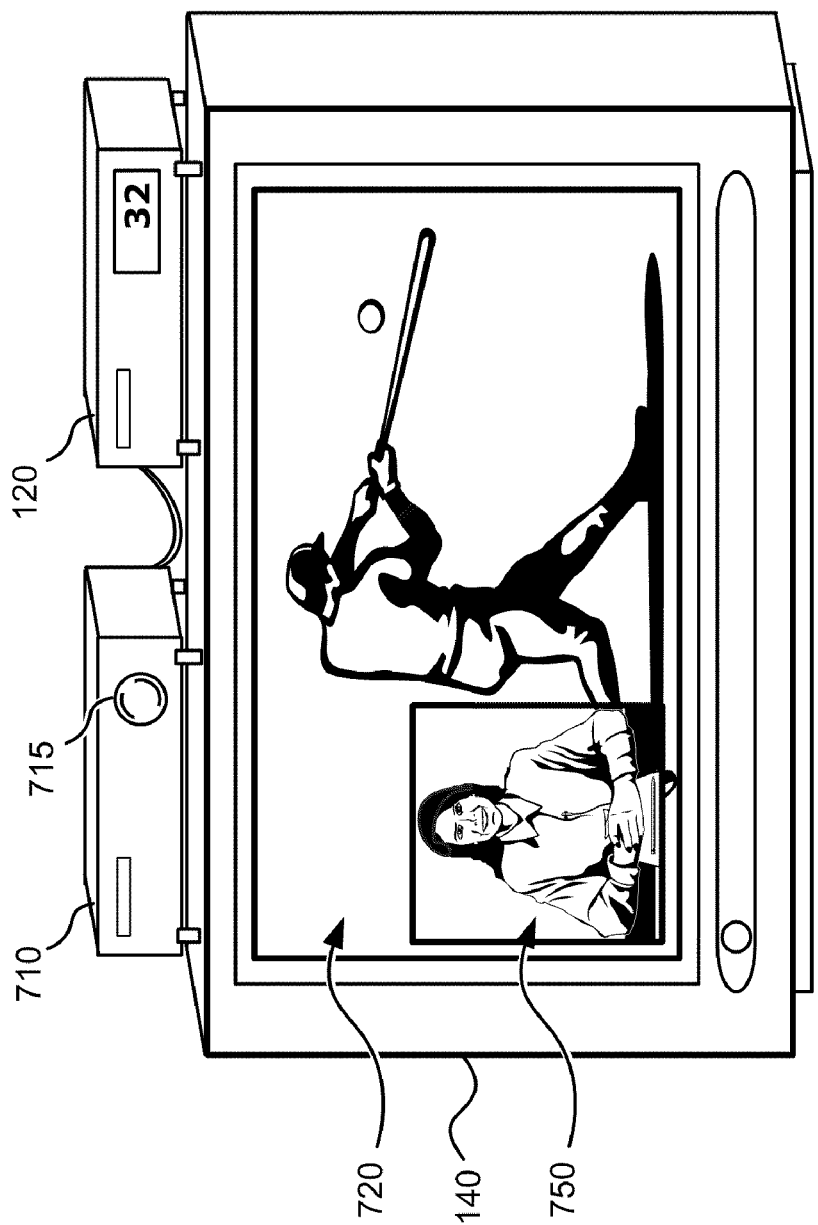

FIGS. 7A and 7B provide exemplary diagrams illustrating implementations of a user interface for content insertion. More specifically, FIG. 7A provides an exemplary diagram of an on-screen interface that may be displayed to solicit viewer input to initiate content insertion, and FIG. 7B provides an exemplary diagram of an on-screen interface that may be displayed in response to the viewer input.

Referring collectively to FIGS. 7A and 7B, a provisioning device 710 may be installed between display device 140 and video client 260. Display device 140 and video client 260 may include the features described above in connection with, for example, FIGS. 1-3. Provisioning device 710 may include the features described above in connection with, for example, provisioning device 110 of FIGS. 1-3 and 5. However, provisioning device 710 may further be configured as a video telephony client to enable video conferencing. Thus, as shown in FIGS. 7A and 7B, provisioning device 710 may include a video camera 715 to collect video images of a viewer (e.g., or, generally, an area in front of camera 715). The viewer may view a program 720 on display device 140 that is supplied from video client 260 through provisioning device 710 (e.g., in pass-through mode). Program 720 may be, for example, linear programming (e.g., broadcast television content) or non-linear programming (e.g., VOD, interactive games, etc.).

As shown in FIG. 7A, a content insertion interface 730 may be displayed simultaneously during a portion of program 720. In one implementation, content insertion interface 730 may be automatically displayed when provisioning device 710 determines that there is additional content to be presented. Additional content may include, for example, an indication that incoming video call is being received by provisioning device 710, a notification of an incoming news item (e.g., an RSS feed), a notification of an incoming message (e.g., an email, a SMS message, a Tweet®, or another message), etc. In another implementation, a viewer may cause content insertion interface 730 to be displayed by pressing a particular button on a remote control 740 associated with provisioning device 710. In such an implementation, content insertion interface 730 may provide options for the viewer to select additional content to be displayed.

As further shown in FIG. 7A, content insertion interface 730 may include an interactive menu that may include an alert, such as a pop-up window, to notify a user of an incoming video telephony call. Menu items in content insertion interface 730 may be selected via remote control 740 to allow a viewer to provide input. For example, when a viewer receives an incoming call, provisioning device 710 may cause display device 140 to display content insertion interface 730. The user may have the ability to reject or accept the call (e.g., by selecting the "ignore" or "accept" icons on content insertion interface 730 via remote control 740).

As shown in FIG. 7B, if the user elects to accept the call, provisioning device 710 may intercept incoming content (e.g., program 720) from video client 260 and insert a video stream and/or camera stream to facilitate the video call. In the implementation of FIG. 7B, the video stream for the video call may be presented as an overlay window 750, such as a picture-in-picture presentation, on display device 140. In other implementations, the video stream for the video call may be presented as another type of overlay, a split screen, or a complete replacement of program 720.

In one implementation, if the user elects to accept the call using content insertion interface 730, provisioning device 710 may send a signal to video client 260 to alter the output of video client 260. For example, provisioning device 710 may cause video client 260 to pause the display of program 720 and record content that continues to be broadcast to video client 260 during the pause period. Content during the pause period may be stored, for example, in a memory (e.g., memory 320) of video client 260 (e.g., using DVR functionality). As another example, provisioning device 710 may cause video client 260 to mute the audio portion of program 720, so as not to interfere with the audio of overlay window 750. When the video telephony call of FIG. 7B is concluded, provisioning device 710 may send another signal to video client 260 to resume audio volume, engage in DVR playback, and/or resume real-time broadcast programming. Provisioning device 710 may then resume a pass-through mode for content from video client 260.

Figure 8:
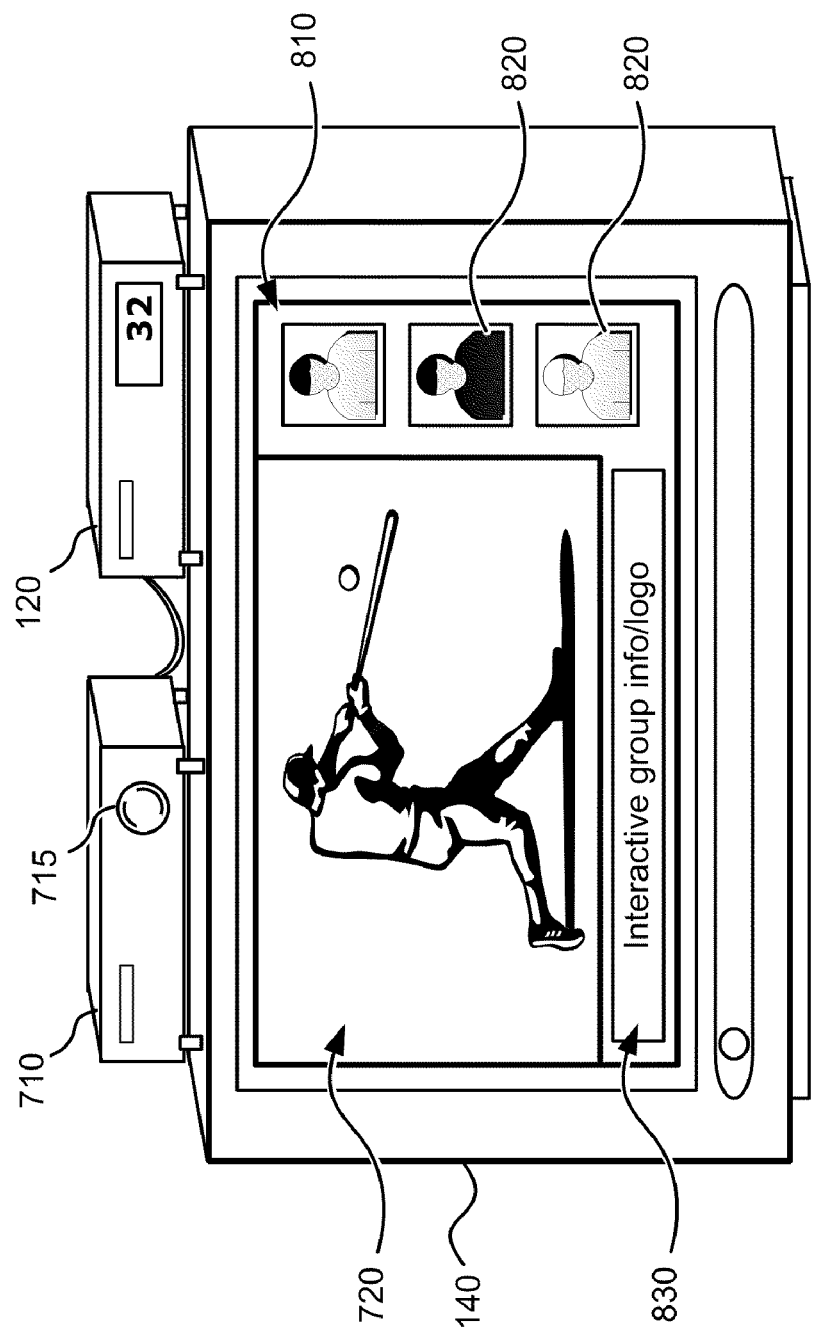
FIG. 8 is an exemplary diagram illustrating another user interface for content insertion according to implementations described herein.

FIG. 8 provides an exemplary diagram illustrating another implementation of a user interface for content insertion. More specifically, FIG. 8 provides an exemplary diagram of an on-screen interface that may be displayed when implementing an interactive viewing group.

As shown in FIG. 8, provisioning device 710 may be installed between display device 140 and video client 260. Provisioning device 710, display device 140, and video client 260 may include the features described above in connection with, for example, FIGS. 7A and 7B. In the implementation of FIG. 8, provisioning device 710 may generate an interactive viewing group interface 810 that may be displayed simultaneously during the display of program 720.

Interactive viewing group interface 810 may include windows 820 for one or more video telephony feeds. Each of windows 820 may provide video/audio feeds for a caller who may also be watching program 720 remotely from (and simultaneously with) the viewer of display device 140. Provisioning device 710 may intercept incoming content (e.g., program 720) from video client 260 and insert a video stream for each of windows 820 to facilitate the interactive viewing group. Thus, a viewer of display device 140 may be able to view/hear program 720 along with interactive commentary from viewers in each of windows 820. The video stream for each of windows 820 may be received, for example, as IP content from alternate content server 230 (FIG. 2) via local router 270 (FIG. 2).

In the implementation of FIG. 8, interactive viewing group interface 810 may be presented as a frame (or partial frame) around a reduced display of program 720 on display device 140. In other implementations, interactive viewing group interface 810 may be presented as another type of overlay, a split screen with program 720. In addition to widows 820, interactive viewing group interface 810 may also include advertising and/or group description information 830 that may supplied, for example, from alternate content server 230, a user device 280, and/or provisioning device 710.

The illustrations of FIGS. 7A-8 provide exemplary formats for presenting content insertion to a user. Other formats and variations may be used.

Implementations described herein may provide systems and/or methods that may intercept program content from a video client or another multimedia device, where the program content includes copy-protection encryption, and that may receive additional content from a local router or another networked device, where the additional content is IP content. The systems and/or methods may remove the copy-protection encryption from the program content and combine the additional content with the program content. The systems and/or methods may also add copy-protection encryption to the combined additional content and program content, and send the copy-protected combined content to a display device.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to the flowchart of FIG. 6, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    intercepting, by a provisioning device, encrypted program content directed toward a display device;
    receiving, by the provisioning device, an insertion signal from another device,
    the insertion signal comprising an indication from the other device that additional content is available to be inserted;
    receiving, by the provisioning device, the additional content from the other device;
    decrypting, by the provisioning device, the encrypted program content to obtain decrypted program content;
    receiving, by the provisioning device, display instructions;
    identifying, by the provisioning device, a mode based on the insertion signal and the display instructions;
    inserting, by the provisioning device and based on the mode, the additional content into the decrypted program content to obtain combined content;
    adding, by the provisioning device, copy protection to the combined content to obtain copy-protected combined content; and
    sending, by the provisioning device and to the display device, the copy-protected combined content.

2. The method of claim 1, where the encrypted program content comprises program content processed by a video client.

3. The method of claim 2, further comprising:
    sending, by the provisioning device and to the video client, a command signal to record the encrypted program content.

4. The method of claim 1, where the copy-protected combined content includes an overlay of the additional content over a portion of the decrypted program content.

5. The method of claim 1, where the additional content is received, from the other device, via Internet protocol (IP).

6. The method of claim 1, where the additional content includes one or more of:
    video telepresence information,
    advertising content,
    really simple syndication (RSS) feeds,
    Internet protocol television (IPTV) content, or
    web-based content.

7. The method of claim 1, where the other device is a local router included within a network of a premises that includes the display device.

8. The method of claim 1, where the copy protection includes high-bandwidth digital content protection (HDCP).

9. The method of claim 1, where the encrypted program content is received by using a high-definition multimedia interface (HDMI).

10. The method of claim 1, where the encrypted program content comprises content from one or more of:
    a digital video recorder (DVR);
    an optical disc player;
    a gaming console; or
    an antenna system.

11. The method of claim 1, where intercepting the encrypted program content comprises:
    notifying, a user of the display device, regarding the additional content,
    receiving, from the user, a selection to accept the additional content, and
    intercepting the encrypted program content after receiving the selection to accept the additional content.

12. A system comprising:
    a processor to:
        receive program content from a video client,
            the program content including copy-protection encryption;
        receive an insertion signal from another device,
            the insertion signal comprising an indication from the other device that additional content is available to be inserted;
        receive the additional content from the other device,
            the additional content being different from the program content;
        remove the copy-protection encryption from the program content to obtain decrypted program content;
        receive display instructions;
        identify a mode based on the insertion signal and the display instructions;
        insert, based on the mode, the additional content into the decrypted program content to obtain combined content;
        add the copy-protection encryption to the combined content to obtain copy-protected combined content; and
        send the copy-protected combined content to a display device.

13. The system of claim 12, where the processor is further to:
    send, to the video client, a command signal to record the program content.

14. The system of claim 12, where the copy-protected combined content includes an overlay of the additional content over at least a portion of the program content.

15. The system of claim 12, where the additional content includes one or more of:
    video telepresence information,
    advertising content,
    really simple syndication (RSS) feeds,
    Internet protocol television (IPTV) content, or
    web-based content.

16. The system of claim 12, where the copy-protection encryption includes high bandwidth digital content protection (HDCP).

17. The system of claim 12, where the program content is provided via a high-definition multimedia interface (HDMI).

18. A non-transitory computer-readable storage medium containing instructions, the instructions comprising:

one or more instructions, executable by at least one processor, to receive copy-protected multimedia content from a first source;

one or more instructions, executable by the at least one processor, to receive an insertion signal from a second source, the insertion signal comprising an indication from the second source that additional content is available to be inserted;

one or more instructions, executable by the at least one processor, to receive the additional content from the second source;

one or more instructions, executable by the at least one processor, to identify, based on the insertion signal, an overlay mode for content delivery;

one or more instructions, executable by the at least one processor, to remove copy-protection from the copy-protected multimedia content to form unprotected multimedia content;

one or more instructions, executable by the at least one processor, to insert, based on the overlay mode, the additional content into the unprotected multimedia content to form combined content; and one or more instructions, executable by the at least one processor, to send the combined content to a display device.

19. The non-transitory computer-readable storage medium of claim 18, the instructions further comprising:

one or more instructions to apply copy-protection to the combined content.

20. A system comprising:

a device to:

receive multimedia content from a first source, receive an insertion signal from a second source, the insertion signal comprising an indication from the second source that Internet Protocol (IP) content is available to be inserted, receive the IP content from the second source, receive display instructions;

identify a mode based on the insertion signal and the display instructions;

insert, based on the mode, the IP content into the multimedia content to obtain combined content, and send the combined content to a display device.

21. The system of claim 20, where the IP content includes content from one or more video telephony sessions.

22. The system of claim 20, where the device is further to:

add, before sending the combined content, copy protection to the combined content.

* * * * *